United States Patent
Kataoka et al.

[11] Patent Number: 5,904,747
[45] Date of Patent: May 18, 1999

[54] METHOD OF MOLDING OPTICAL ARTICLES

[75] Inventors: Hidenao Kataoka, Hirakata; Makoto Umetani, Izumi; Shoji Nakamura, Hirakata; Yoshinari Kashiwagi, Neyagawa, all of Japan

[73] Assignee: Matsushita Electric Industrial Co., Ltd., Osaka, Japan

[21] Appl. No.: 08/833,559

[22] Filed: Apr. 7, 1997

Related U.S. Application Data

[63] Continuation of application No. 08/423,932, Apr. 18, 1995, abandoned, which is a continuation of application No. 08/206,943, Mar. 7, 1994, abandoned.

[30] Foreign Application Priority Data

Mar. 8, 1993 [JP] Japan .................................. 5-046313

[51] Int. Cl.⁶ .................................................. C03B 23/00
[52] U.S. Cl. .................................. 65/102; 65/64; 264/2.7
[58] Field of Search .......................... 65/102, 64; 264/2.7, 264/1.1

[56] References Cited

U.S. PATENT DOCUMENTS

| 4,397,669 | 8/1983 | Haisma et al. | |
| 5,032,160 | 7/1991 | Murata et al. | 65/102 |
| 5,160,361 | 11/1992 | Murata et al. | 65/102 |
| 5,630,859 | 5/1997 | Takagi et al. | 65/102 |

FOREIGN PATENT DOCUMENTS

| 60-246231 | 12/1985 | Japan . | |
| 61-261225 | 11/1986 | Japan . | |
| 39001 | 2/1990 | Japan | 65/102 |
| 3-050126 | 3/1991 | Japan . | |

OTHER PUBLICATIONS

English Abstract of Japan No.04330403, Nov. 18, 1992.
English Abstract of Japan No.04046021, Feb. 17, 1992.
English Abstract of Japan No.04198033, Jul. 17, 1992.
English Abstract of Japan No. 04317427, Nov. 9, 1992.
English Abstract of Japan No. 03050126, Mar. 4, 1991.
English Abtract of Japan No. 61261225, Nov. 19, 1986.
English Abstract of Japan No. 60246231, Dec. 5, 1985.

*Primary Examiner*—Steven P. Griffin
*Attorney, Agent, or Firm*—McDermott, Will & Emery

[57] ABSTRACT

A method for press molding preforms to obtain optical articles in which each preform is prepared beforehand to have a diameter larger than that of an optically functional area of the optical article and edges of the preform to be press mold contact with molding surfaces of a pair of molds outside an area of each molding surface corresponding to the optically functional area of the optical article, thereby elongating the lifetime of molds.

5 Claims, 6 Drawing Sheets

METHOD OF MOLDING OPTICAL ARTICLES

This is a continuation of application Ser. No. 08/423,932 filed Apr. 18, 1995, now abandoned, which was a continuation application of application Ser. No. 08/206,943, filed Mar. 7, 1994, now abandoned.

BACKGROUND OF THE INVENTION

1. Field of the Invention

The present invention relates to a method of manufacturing optical articles of high precision and high quality by press molding, which considerably lengthens the lifetime of molds being used.

2. Explanation of the Prior Art

Many methods of manufacturing optical articles have been proposed. An example among them is disclosed in Japanese patent laid-open publication HEI 3-50126: a preform having a given shape is placed between a pair of molds which have a molding surface precisely shaped in the reverse of the desired optical article to form, the preform being heated to a temperature at which it can be reshaped, then being pressed to form a desired optical article, and finally being cooled down to the room temperature. An example of a preform for use in the molding is described in the Japanese patent laid-open publication SHO 60-246231 as a glass cylinder cut to a given length, both the end surfaces being polished to a mirror finished surface as shown in FIG. 11. The Japanese patent laid-open publication SHO 61-261225 describes another example of a preform, which is a block of glass shaped to a sphere as shown in FIG. 12.

In the meanwhile, the lifetime of molds is a very important factor in the press molding of optical articles. Namely, the cost for manufacturing molds becomes very high since they need a very high precision finishing to mold optical articles of a high precision. The price of each optical article press molded includes a fraction of the manufacturing cost of molds naturally. Thus, the cost per optical article to be charged becomes lower as the lifetime of molds becomes longer.

Conventionally, special cares have been paid for the hardness of a preform material and protection layer formed on a molding surface to enhance the lifetime of molds. Since the molding surface contacts with a preform heated up to a high temperature, it must be covered by a protection layer which is hardly oxidized and inactive to the preform material such as glass.

Material for molds must have a hardness enough for maintaining a high working precision against forces exerted from the preform. As to the material for molds, cemented carbides or metals including tungsten are used satisfactorily and platinum film is used for the protection layer. The high precision press molding of optical articles becomes available by development of material for molds and protection layer mentioned above.

The mold having a protection layer is gradually deteriorated in its shape precision by use for a long time and the surface of the protection layer is roughened by continual contact with glass of a high temperature. Optical articles thus press molded are deteriorated in the shape precision gradually and, finally, become impossible to satisfy the specification thereof. In actual use, the lifetime of molds is estimated so at a time a little bit before optical articles become unsatisfactory and is indicated by the number of good optical articles producible thereby.

Conventionally, it has been considered that one of the main factors dominating the lifetime of molds is deterioration in shape of molds. Accordingly, trials for lengthening the lifetime of molds and, thereby, reducing the price of optical articles are directed to development of new materials for molds.

Inventors of the present invention found out the fact that the lifetime of molds was dominated by relationship between a shape of a molding surface and that of a preform. This will be explained in detail below.

Consider a press molding of cylindrical glass preforms as shown in FIG. 11.

At the first stage of the press molding, top and bottom molds 11 and 12 having molding surfaces 11a and 12a, respectively, contact with circular edges A and B of a cylindrical preform 14 at first. At this stage, a press force against the preform is maintained at a small value to avoid the preform from breaking or cracking. As the molding progresses with increase of contact areas between the molding surface and the preform, the press force is gradually increased and, at the final stage, a full press force is applied to deform the preform as a whole. At the first stage, edges A and B abut to the same portions of molds always. Thus, concentrated stresses are repeatedly applied to the same portions of molds resulting in earlier deterioration of the same portions. In fact, minute concave defects are caused at the specific portion of the molding surface and they are transferred as minute convex defects to a surface of an optical article upon press molding. Thus, the lifetime of molds is determined by generation of these defects substantially.

In the case as shown in FIG. 12, point C on the molding surface receives a concentrated stress repeatedly and, accordingly, a defect is caused thereat.

SUMMARY OF THE INVENTION

One may solve the above described problem of molding by placing a preform between top and bottom molds so that the preform is in contact with the molding surfaces only out of their optically functional areas. The preform is then heated and pressed to form a desirable shape. The preform, therefore, must be formed so that it is in contact with the molding surfaces only outside their optically functional areas.

The press process may be carried out in error before the preform is heated to a sufficiently high temperature at which it has a low enough viscosity and can change its shape. In this case the preform would create flaws and deformation on the molding surfaces by the concentrated stresses generated at the contacts with the molding surfaces. In employing the proposed molding method in the present invention, however, the defects would remain out of the optically functional areas, and they would not adversely affect the performance of optical articles thus formed. Further, the molds maintain a long lifetime despite the defects thus created.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

EMBODIMENT 1

Figure 1:
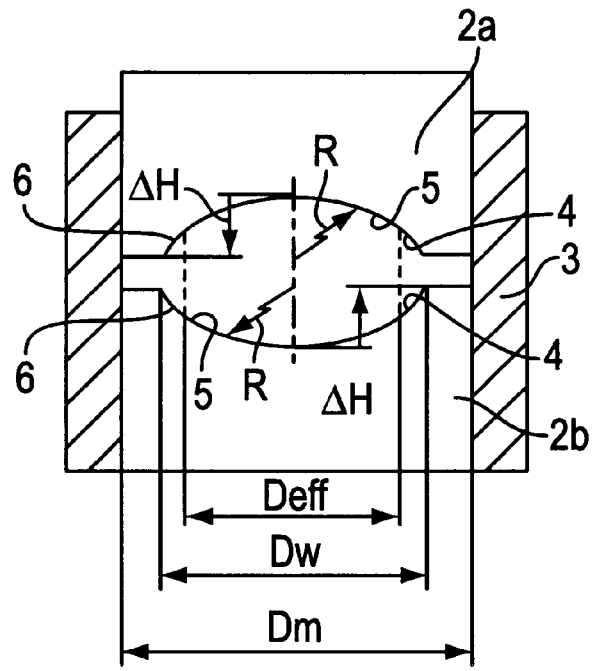
FIG. 1 is a schematical cross-sectional view of a main portion of a press molding machine according to the present invention.

The first embodiment of the present invention will be described with reference to FIG. 1 to FIG. 3. In these figures reference numeral 1a represents a preform, 2a a top mold, 2b a bottom mold, and 3 a guide cylinder or guide.

Figure 2:
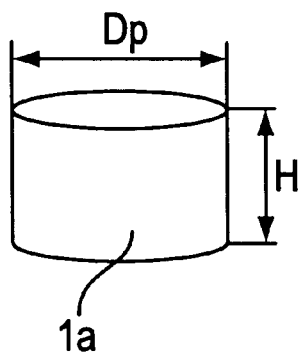
FIG. 2 is a perspective view of a preform.

Top and bottom molds 2a and 2b have a spherical molding surface 4 machined and processed with precision and have a radius R of curvature of 4.0 mm, a depth $\Delta H$ of 3.0 mm, a diameter (working diameter) $D_w$ of the concave of 7.7 mm and a diameter $D_m$ of the mold of 10.0 mm as shown in FIG. 1. The molding surface 4 consists of an inner area 5 of a diameter $D_{eff}$ of 6.4 mm which press molds an optically functional portion of an optical article and an outer area 6 which press molds an optically non-functional portion of the optical article. Normally a protection layer is formed on the entire area of the molding surface including both optically functional and non-functional areas, although it is not shown in FIG. 1.

As used herein, the expressions "optically functional area and optically non-functional area" mean the following: A biconvex lens formed by this method of press molding has smooth surfaces which are transferred from the entire area of the molding surfaces. The lens is used for imaging or collecting light. These optical functions are achieved by the light which passes through the area of lens surfaces which are transferred from the optically functional area of the molding surfaces. Therefore, the optically functional area is not allowed to contain any flaw or deformation. Light may be blocked by means of an iris diaphragm to be incident on the areas of the lens surfaces which are transferred from the optically non-functional area of the molding surface. Therefore, this area is not as critical as the optically functional area in terms of the optical performance of the lens. Normally both the optically functional and non-functional areas are processed in the same precision, hence have the same surface smoothness and precision in shape. The optically functional area, however, needs an extremely careful attention to ensure a good surface accuracy and quality.

The inside surface of the guide 3 is finely processed so that the top and bottom molds smoothly slide inside guide 3 along the common center axis. The inner diameter of the guide is 10 mm as shown in FIG. 1. The material of molds and guide is a cemented carbide. Preform 1a as shown in FIG. 2 is a cylinder of 7.0 mm in diameter and 6.4 mm in height. The diameter was determined so that when the preform is placed between top and bottom molds 2a and 2b, the edges of the end surfaces of the cylinder are in contact with the molding surfaces outside the optically functional area of which diameter is 6.4 mm. The material of the preform is SF-8 (lead glass, the glass transition temperature: 420° C., and the coefficient of linear thermal expansion: $90 \times 10^{-7}/°C.$ between 100° C. and 300° C.)

Figure 3:
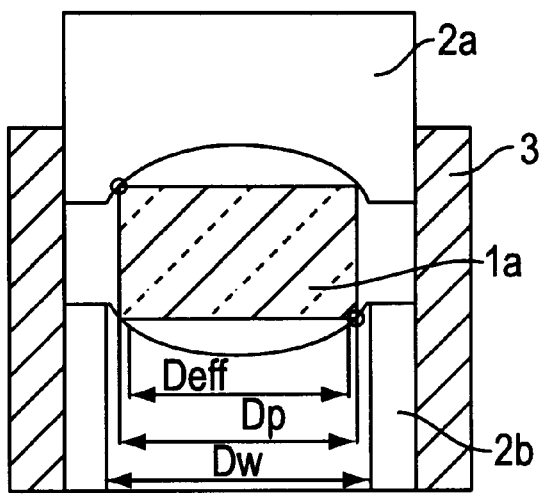
FIG. 3 is a schematical cross-sectional view for showing the first stage of press molding.
Figure 5:
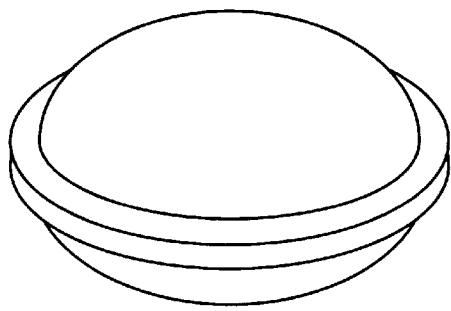
FIG. 5 is a perspective view of a convex lens for showing defects transferred thereto.
Figure 4:
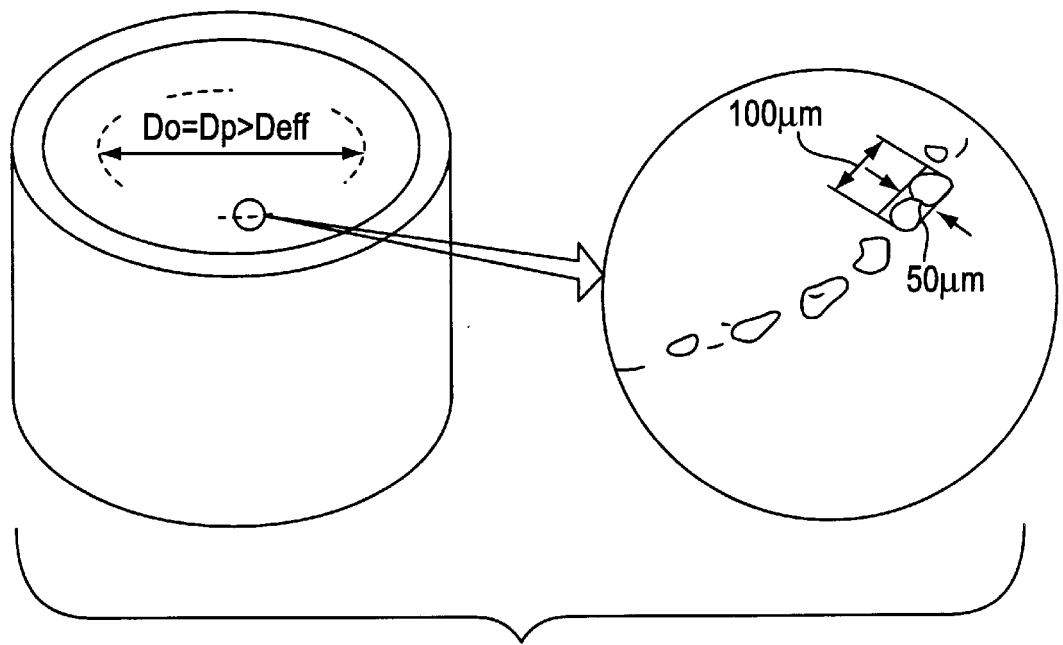
FIG. 4 is a perspective view of a bottom mold for showing defects caused on a press molding surface thereof.

FIG. 3 shows an arrangement in which preform 1a is placed in a cavity formed by molds 2a, 2b, and guide 3. Preform 1a was set in the center of the cavity so that the edges of the end faces of the preform cylinder are in contact with the molding surfaces within the optically non-functional area. The mold assembly with the preform in it was heated up to a relatively low temperature of 480° C. and then the preform was pressed at a high pressure of 2.5 kgf/mm². They were subsequently cooled down to the room temperature, and the formed lens was removed from the mold assembly. In this process conditions the preform 1a has a relatively high viscosity. After 100 press moldings the molding surfaces of top and bottom molds 2a and 2b were examined under a microscope, and a ring of deep flaws having a width of about 0.2 mm and a center diameter $D_o$ 7.0 mm was observed on each molding surface, as illustrated in FIG. 4. This ring was outside the optically functional area. The lens also had the same rings of flaws which were transferred from the molds, as illustrated in FIG. 5. The center diameter $D_o$ of the ring generated on the molding surfaces coincide with that of preform cylinder 1a. The flaws are, therefore, considered to have been created by the concentrated stress on the molding surfaces against the edges of the end faces of preform 1a. Being limited to outside the optically functional area, the flaws of lens did not adversely affect its performance, and the molds having this kind of flaws were kept being used after this examination to form lenses of good optical performance. The wave front distortion of the lens measured with a Fizeau type interferometer was ¼ to ⅕ (1=633 nm) as a P-V value. Although in this embodiment flaws are generated on the molding surfaces, they do not reduce the lifetime of the molds. In fact the lifetime of the mold was a few tens of thousands shots.

For comparison a different preform from the one mentioned above was used with the same molds 2a, 2b, and guide 3. This preform was also a cylinder, being 9.4 mm in height and 5.8 mm in a diameter which is less than that of the optically functional area. It was placed at the center of the mold assembly cavity and subjected to press molding in the same conditions as before. In this case the preform was always in contact with the molding surfaces inside the optically functional area. After 100 shots molds 2a and 2b were examined under a microscope and a ring of deep flaws was found at a center diameter of about 5.8 mm of each molding surface, which is inside the optically functional area. Similarly to the previous case the diameter coincides with that of the preform, and the flaws are considered to have been caused by the concentrated stress on the molding surfaces against the edges of the end faces of the preform. The flaws exist within the optically functional area and the formed lenses exhibited poor optical performance and were not usable in practical applications. In fact measurement of wave front distortion was impossible. Therefore, the molds were not usable afterwards and the lifetime must be shorter than 100 shots.

EMBODIMENT 2

The second embodiment of the present invention will be described with reference to FIGS. 6 and 7. Reference numeral 1c represents a preform; 2a and 2b top and bottom molds, and 3 a guide which are the same as those used in embodiment 1.

Figure 6:
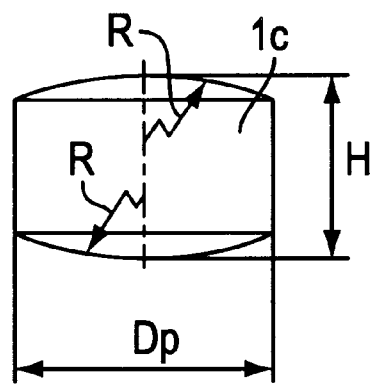
FIG. 6 is a front view of another preform to be press molded.

Preform 1c is a cylinder which has convex end surfaces as shown in FIG. 6. The diameter $D_P$ of preform 1c is 7.0 mm and the top and bottom convex surfaces have a radius R of curvature of 10 mm which is larger than that of the molding surfaces of molds 2a and 2b. Therefore, when the preform is placed in the middle between molds 2a and 2b, the preform is in contact with molds 2a and 2b only outside the optically functional area having a diameter $D_{eff}$ of 6.4 mm. The height H of the preform is 7.8 mm. The material of the preform is optical glass SF-8 which is the same as the one in embodiment 1. (lead glass, the glass transition temperature: 420° C., and the coefficient of linear thermal expansion: $90 \times 10^{-7}/°$ C. between 100° C. and 300° C.)

Figure 7:
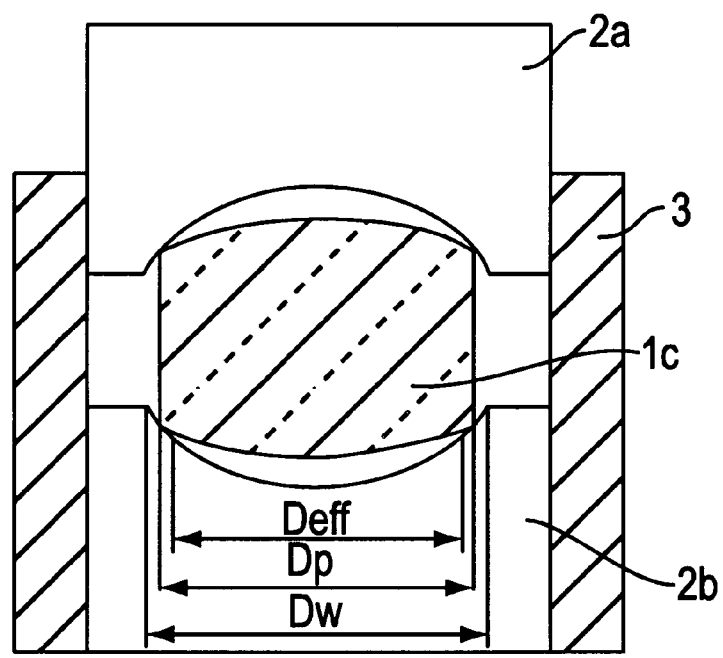
FIG. 7 is a schematical cross-sectional view of a main portion of a press molding machine according to the present invention.

FIG. 7 shows an arrangement in which preform 1c is placed in the cavity formed by molds 2a, 2b, and guide 3. As shown in FIG. 7 preform 1c was placed in the center of the cavity so that the edges of the end faces of the preform are in contact with the molding surfaces in the optically non-functional area. The mold assembly with the preform in it was heated up to a relatively low temperature of 470° C. and then the preform was pressed at a high pressure of 2.6 kgf/mm². After 100 press moldings the molding surfaces of top and bottom molds 2a and 2b were examined under a microscope, and a ring of deep flaws of about 6.9 mm in center diameter was observed on the molding surface of top mold 2a. The lenses thus formed had the same ring of flaws which was transferred from the mold. The center diameter of the ring formed on the molding surface coincides with that of cylinder 1c. The ring of flaws, therefore, is considered to have been formed by the concentrated stress on the molding surface against the edge of the end face of preform 1c. Being limited to outside the optically functional area, the flaws did not adversely affect the performance of the lens, which was approximately the same as that of embodiment 1. The molds having this kind of flaws were kept being used after this examination to form lenses of good optical performance. In fact the lifetime of the mold was a few tens of thousands shots.

EMBODIMENT 3

Figure 9:
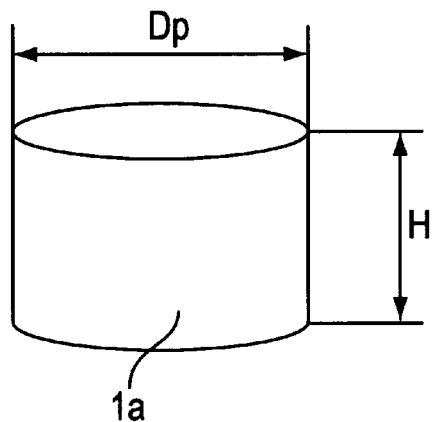
FIG. 9 is a perspective view of a preform to be molded by the press mold shown in FIG. 8.

The third embodiment of the present invention will be described with reference to FIGS. 8, 9 and 10.

Figure 8:
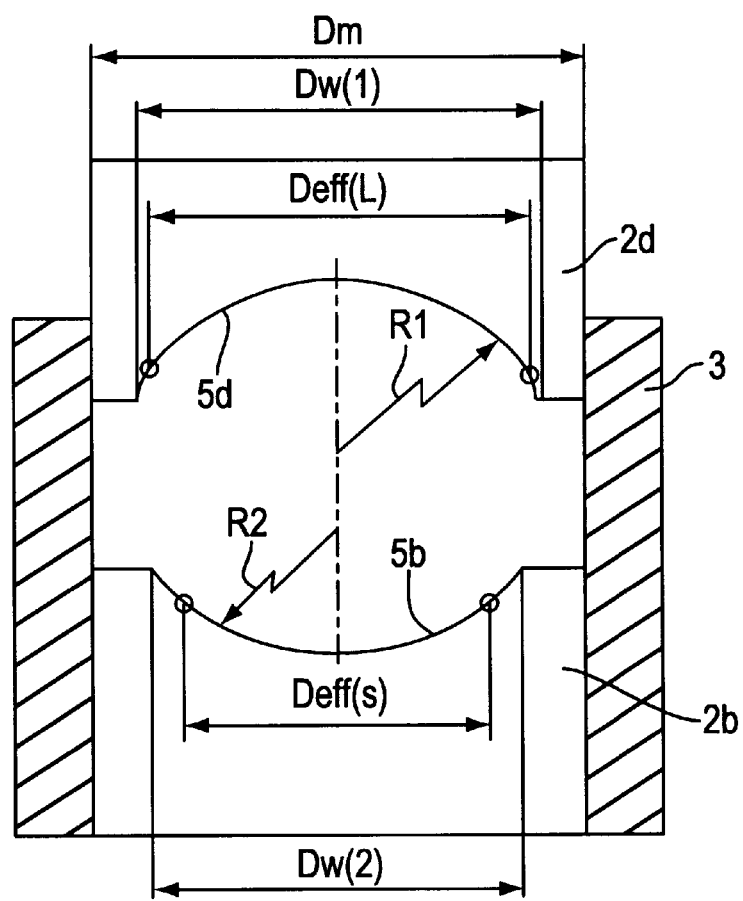
FIG. 8 is a schematical cross-sectional view of a main portion of a press molding machine according to the present invention.

As shown in FIG. 8, top mold 2d has a molding surface 5d having a radius R1 of curvature of 6.8 mm and bottom mold 2b has a molding surface 5b having a radius R2 of curvature of 4.0 mm. The optically functional diameter $D_{eff}(L)$ of top mold 2d is 6.7 mm and that $D_{eff}(S)$ of bottom mold 2b is 6.4 mm.

Preform 1a to be press molded is cylindrical and has a diameter $D_P$ of 7.0 mm and the height H of 6.4 mm.

In this embodiment 3, it is important that diameter $D_P$ of preform 1a is larger than optically functional diameter $D_{eff}(L)$ of top mold 2d which is larger than $D_{eff}(S)$ of bottom mold 2b.

Figure 10:
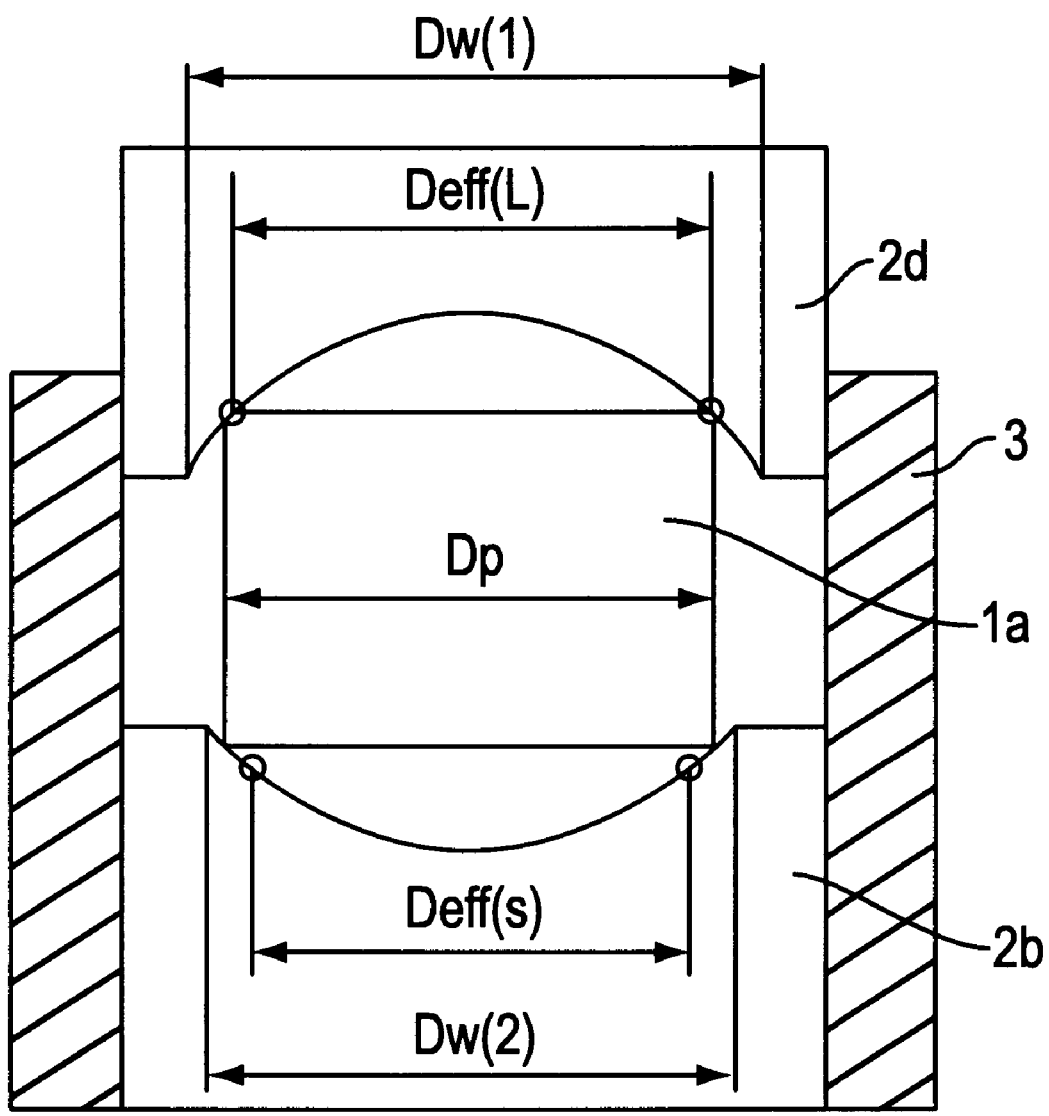
FIG. 10 is a schematical cross-sectional view of a main portion of a press molding machine according to the present invention.
Figure 11:
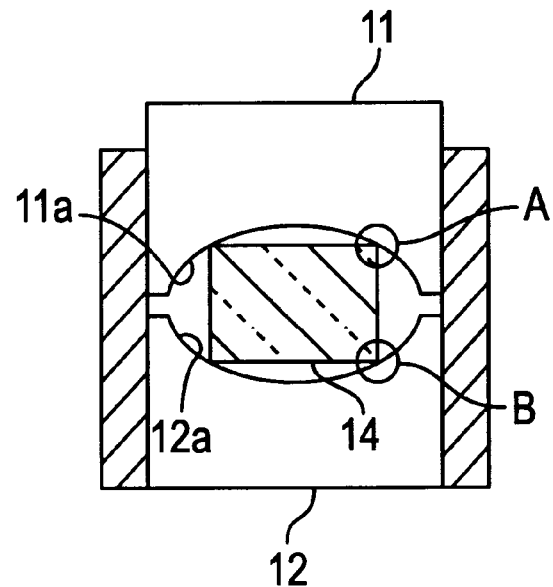
FIG. 11 is a schematical cross-sectional view of a main portion of a conventional press molding machine.
Figure 12:
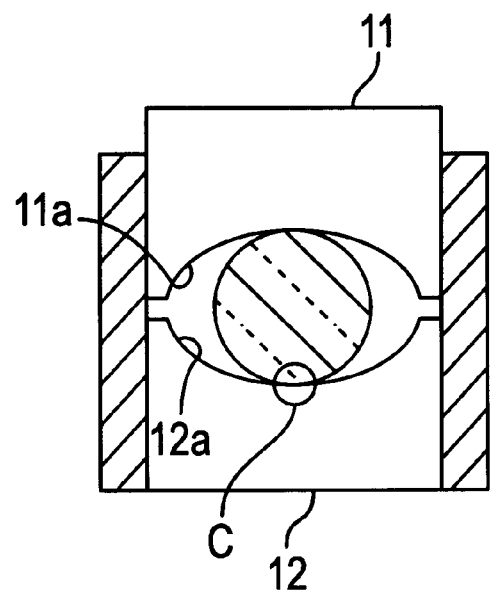
FIG. 12 is a schematical cross-sectional view similar to FIG. 11 to show a spherical preform to be press molded.

Thus, circular edges of preform 1a contact with top and bottom molds 2d and 2b outer the optically functional areas, respectively, as shown in FIG. 10.

This guarantees a long lifetime of molds similarly to embodiments 1 and 2.

In embodiments 1, 2 and 3 glass was used as an example of a material for preforms. The shapes of the preforms and the method of molding presented herein are also applied to other materials. In the embodiments described above the preform is in contact with the molding surfaces in a circle at the beginning of the press molding. This invention, however, is not limited to a case in which a preform is in contact with molding surfaces in a circle. In fact any figure is allowed. For example, a rectangle and a part of a circle will be as good as a circle. The essence of the present invention is that so as to considerably lengthen the lifetime of the molds a preform is made in an appropriate shape and size so that the part of the molds which the preform is in contact with and the concentration of stress take place at and remain out of the optically functional area of the molds and that the preform is placed at an appropriate position with regard to molds.

Further it is to be noted that the heating process can be omitted if the preform is made of a material easy to press mold or it is softened before charging the same between a pair of molds.

Although present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of manufacturing an optical article, comprising optical curvatures on both sides of said optical article and said optical curvatures comprising optically functional areas of optically functional diameters which are less than diameters of the optical curvatures, comprising the steps of:

preparing a cylindrical preform to be molded using a pair of molds comprising molding curvatures of working diameters which are equal to respective diameters of said optical curvatures of said optical article, said optically functional diameters being smaller than said working diameters, the cylindrical preform having a diameter that is less than a larger one of said working diameters and larger than a larger one of said optically functional diameters of said optical article; and placing said cylindrical preform between said molding curvatures of said pair of molds; and pressing said cylindrical preform with said molds so that the shapes of said molding curvatures are transferred to said cylindrical preform.

2. The method of manufacturing the optical article according to claim 1, wherein each mold of said pair of molds comprises a concave molding curvature to mold said optical article such that the optical curvatures of the optical article are in the shape of convex lenses and said cylindrical preform has a columnar shape having a larger diameter than said optically functional diameters of said optically functional areas of said optical article, said cylindrical preform being placed between said concave molding curvatures with end surfaces of said cylindrical preform facing said concave molding curvatures.

3. The method of manufacturing the optical article according to claim 2, wherein said columnar shape is a circular cylinder.

4. The method of manufacturing the optical article according to claim 1, wherein said optical article comprises a first optically functional area on one side and a second optically functional area on a different side thereof, said first optically functional area having a different optically functional diameter than said second optically functional area, and said cylindrical preform having a diameter larger than the larger optically functional diameter of said first and second optically functional areas.

5. The method of manufacturing the optical article according to claim 1, further comprising a step of heating said preform to soften the same before the step of pressing said preform.

* * * * *